United States Patent [19]
McKinney

[11] 3,796,307
[45] Mar. 12, 1974

[54] CORRUGATE-FILM LAMINATE PACKAGE MATERIAL AND PACKAGE

[75] Inventor: James C. McKinney, Greenville, S.C.

[73] Assignee: W. R. Grace & Co., Duncan, S.C.

[22] Filed: June 5, 1972

[21] Appl. No.: 260,015

Related U.S. Application Data

[62] Division of Ser. No. 71,063, Sept. 10, 1970, Pat. No. 3,694,995.

[52] U.S. Cl. .................. 206/521, 156/84, 161/133, 206/819, 229/87 R
[51] Int. Cl...... B65d 65/40, B65d 65/44, B32b 3/28
[58] Field of Search ..... 206/65 S, 46 FR; 229/87 R, 229/DIG. 2, DIG. 12; 161/133; 156/84

[56] References Cited
UNITED STATES PATENTS

| | | |
|---|---|---|
| 2,833,404 | 5/1958 | Jacobs et al. ................... 206/65 R |
| 3,142,599 | 7/1964 | Chavannes ............... 206/46 FR UX |
| 3,406,052 | 10/1968 | Peters ............................. 161/139 X |
| 3,562,999 | 2/1971 | Barbedienne .................. 206/65 S X |
| 3,627,116 | 12/1971 | Cooper .......................... 206/65 S X |
| 2,553,923 | 5/1951 | Lambert ............................. 206/59 R |
| 3,050,402 | 8/1962 | Dreyfus et al. ............. 206/46 F UX |

Primary Examiner—Leonard Summer
Attorney, Agent, or Firm—John J. Toney; William D. Lee, Jr.

[57] ABSTRACT

This invention comprises a corrugated package material wherein the corrugated fluting is attached to one or more sheets of heat shrinkable polymeric film. The heat shrinkable film is preferably on only one side of the corrugated fluting, but may be on both sides of the corrugated fluting. This packaging material is then formed into a carton and this carton filled; or is used to bundle a series of containers, and the final assembly, whether a carton or bundle, heat shrunk, whereby the strength of the corrugate is increased.

3 Claims, 5 Drawing Figures

PATENTED MAR 12 1974 3,796,307

CORRUGATE-FILM LAMINATE PACKAGE MATERIAL AND PACKAGE

This is a division of application, Ser. No. 71,063, filed Sept. 10, 1970, now U.S. Pat. No. 3,694,995, issued Oct. 3, 1972.

BACKGROUND OF THE INVENTION

This invention relates to a corrugated material attached to a heat shrinkable polymeric film, forming a corrugated composite for packaging. The invention further relates to a package wherein containers are within a carton formed from this corrugated composite; or containers are bundled in this material, and the polymeric film is then shrunk to increase the strength of the fluting and the final package.

Corrugated cartons are a standard item in commerce for transporting a series of smaller containers. These cartons maintain the containers in a set orientation, protect the container surfaces from damage, and give strength to allow stacking for more efficient storage and transport. Further, corrugated cartons to a degree protect these containers against moisture and weather, preserving the more decorative containers within the carton. There is a nonending search for cartons which are light-weight, strong, of low bulk, weather proof, can still maintain the packaged containers in a set orientation, and are stackable without carton or bundle distortion. The present invention is directed to such a packaging material and package. In the present invention, corrugated fluting is attached to a heat shrinkable polymeric film. This is then either formed into a carton or used to bundle a series of containers. When in the form of a carton, it is filled with containers and sealed. In either form, carton or bundle, the package is then heat-treated to shrink the polymeric film and tighten the corrugated fluting core. This operation of heat-shrinking serves both to tighten the fluting and to place the package in a state of compression. When stacked, the sides of the carton or bundle are not readily placed in a bulging tension condition without exerting forces greater than those experienced in normal warehousing.

The prior art is illustrated by any of U.S. Pat. Nos. 3,407,987, 3,406,052 and 3,411,689. U.S. Pat. No. 3,407,987 sets out a corrugated packaging material suitable for bundling. U.S. Pat. No. 3,406,052 discloses plastic coated corrugated fiberboards and methods for making this material. The corrugated flute is here coated on one or two sides with the plastic. However, this plastic is not of a shrinkable variety, and thus is not a similar material, and will not produce stackable, non-bulging cartons and bundles. U.S. Pat. No. 3,411,689 sets out a reinforced corrugated paperboard carton material and carton. In this instance, a strong non-bulging carton is formed, but it entails the use of a thermoplastic material for strengthening. Further, for strength, the container is quite massive. Thick layers of paperboard are necessary to produce a non-bulging side wall when stacked. The present invention provides a low bulk, light-weight packaging material. When formed into cartons or bundles, these packages will not bulge when under a force such as in stacking. These packages maintain their shape by having a tightened corrugated core, and the carton or bundle is under a compressive force which resists sidewall distortion on stacking.

It is an object of this invention to set out a packaging material capable of being formed into a sidewall bulge-resistant carton or bundle.

It is also an object of this invention to disclose a packaging material wherein corrugated flutes are attached to polymeric heat-shrinkable film which is then formed into a carton or used as a bundling material.

It is further an object of this invention to provide a corrugated container of high strength, but of a low weight and bulk, and stackable for storage.

BRIEF SUMMARY OF THE INVENTION

Briefly, this invention comprises a new corrugated packaging material and new cartons and bundled packages produced from this material. The corrugated packaging material is constructed of a corrugated fluting attached to a heat-shrinkable polymeric film. The polymeric film can be attached to one or both sides of the corrugated fluting. In use, this material is either formed into a carton or used to bundle a plurality of containers. This package is then heated to shrink the polymeric film which tightens the corrugated fluting, keeping the fluting in a tightened condition and the package in a compressed state. In this condition, forces due to stacking fail to bulge or distort the package, facilitating warehouse storage.

DETAILED DESCRIPTION OF THE INVENTION

Figure 1:
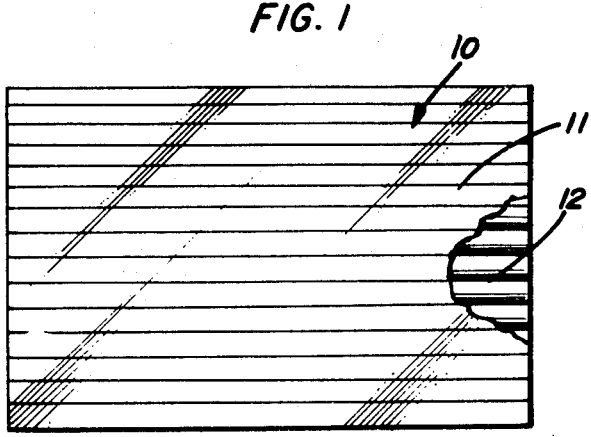
FIG. 1 is a plan view of the corrugated packaging material.

More specifically, the preferred embodiments are set out in the accompanying drawings which will now be more fully discussed. FIG. 1 is a plan view of the packaging material 10. This material comprises a heat-shrinkable polymeric film layer 11 adhesively attached to a paper or paperboard corrugate 12. The polymeric film in this invention must be of a heat-shrinkable variety. By heat-shrinkable polymeric film is meant any of the conventional uniaxially oriented polymeric films which on the application of heat are shrunk to a decreased surface area. Such films comprise oriented polyolefinic films such as polypropylene, polyethylene, polyisopropylethylene and polyisobutylethylene. Other exemplary films are polystyrene, polyethylene terephthalate, polyethylene-2,6-naphthalate, polyethylene-1,5-naphthalate, polytetramethylene-1,2-dioxybenzoate, polyhexamethylene adipamide, polyhexamethylene sebacamide, polycaprolactum, polyvinylchloride and polymethylmethacrylate. Also included are polymers of alpha mono-olefinically unsaturated hydrocarbons with organic compounds having polymer producing unsaturation such as is present in butene, vinyl acetate, vinyl stearate, vinyl formate, methyl acrylate, 2-ethyl hexyl acrylate, acrylic acid, isoprene, butadiene acrylamide, methacrylic acid, ethyl acrylate N-methyl-n-vinyl acetamide and the like. This list is illustrative of the types of polymeric films known in the art and is not an exhaustive citation of heat-shrinkable polymeric films. Others are known to the art and exhibit varying degrees of shrink on heating, and are useful in and a part of this invention.

The film in a preferred embodiment is a polyolefin, and preferably polypropylene. Polypropylene is readily and uniaxially oriented, is dimensionally stable on storage, readily workable for bonding corrugated fluting, and can be heat-shrunk at moderate temperatures. The thickness of the film is not critical to the invention, and may range from 10 mils to 30 mils.

The corrugated fluting 12 may be of any type and will depend on the substance to be packaged and the protection required. The fluting material may be of paper, paperboard, plastic or a combination of paper and plastic or paperboard and plastic. In a preferred and most useful embodiment, the corrugation is a standard paperboard of A, B or C designation. A-corrugation has approximately 36 flutes per foot, B-corrugation has approximately 52 flutes per foot, and C-corrugation has approximately 42 flutes per foot. The fluting material may range in thickness from 0.005 inch to 0.02 inch, depending on the package requirements. A preferred thickness is 0.009 inch. The flutes are either adhesively bonded to the film 11 using a standard adhesive such as starch or some other special purpose adhesive, or heat sealed, since in many instances the film at elevated temperatures has adhesive properties.

Figure 2:
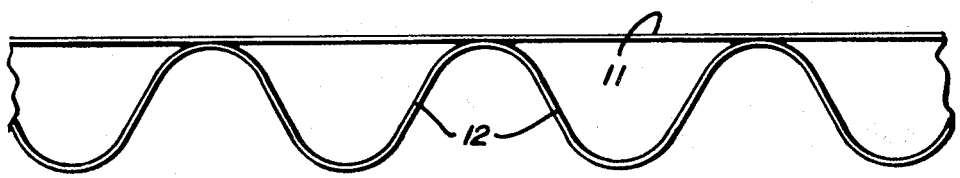
FIG. 2 is an elevation of a single face corrugated packaging material.
Figure 3:
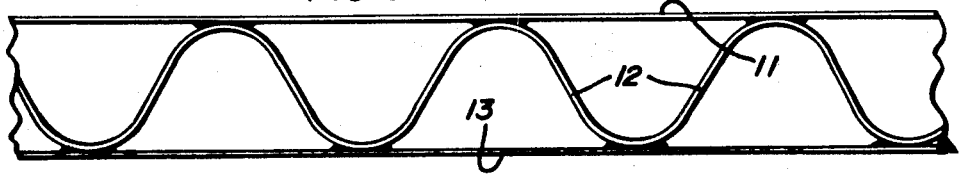
FIG. 3 is an elevation of the double face embodiment of the packaging material.

FIG. 2 sets out in cross-section a single face corrugated medium. In this embodiment, the fluting 12 is bonded to a single sheet of film. In this instance, the film is preferably polypropylene. The film thickness is 15 mil and the corrugate fluting is 0.009 inch thick and contains 36 flutes per foot. FIG. 3 sets out in cross-section a double face board. The fluting 12 and film 11 are the same as in FIG. 2. Film 13 is also of a heat-shrinkable variety, and may have the same or differing shrink properties as film 11.

Figure 4:
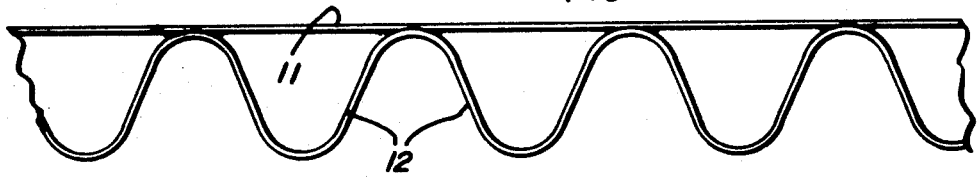
FIG. 4 is an elevation of the corrugated packaging material of FIG. 2 with the backing sheet in a shrunken condition.

FIG. 4 sets out in cross-section an exploded view of the corrugate fluting and film of FIG. 2 after heat-shrinkage of the film. The film 11, in this instance polypropylene, is heat-shrunk by heating the corrugate-film composite to 250°F to 330°F. For other heat-shrinkable polymer films, the temperature ranges from about 150°F to about 350°F. These temperatures are those generally encountered, and this invention is operable at other temperatures depending on conditions. For example, shrink tunnel temperatures may be as high as 400°F, depending on the thickness of the wrapping, rate of passage through the tunnel and other factors. The corrugate core is in this instance in a tightened condition having greater than the original 36 flutes per foot.

Figure 5:
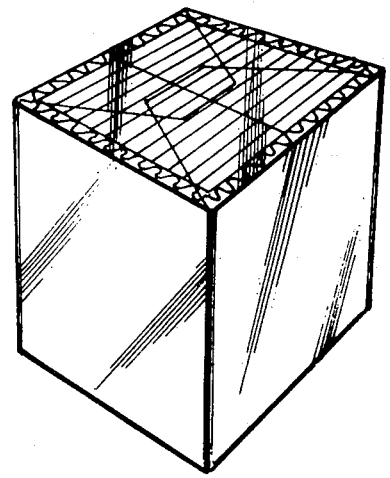
FIG. 5 is a perspective view of bundled containers.

FIG. 5 is a perspective view of a plurality of containers bundled within the present packaging material, and the polymeric film shrunk, putting the corrugate core in a tightened condition and the bundle in a compressed state. The bundle in this embodiment contains tightened corrugated fluting on four sides and clear plastic film on the ends. This packaging material may be essentially that of FIG. 1, but with the film 11 extending beyond the fluting 12 on each side in the direction longitudinal with the flutes. This film may be of a uniaxially or biaxially oriented type, however, in a preferred embodiment when the shrinkable film extends beyond the fluting it should be of a biaxially oriented type. By using a biaxially oriented type, not only will the corrugations be strengthened, but the entire package will be strengthened. The corrugated fluting may be of the single or double face type, however, for bundling it is preferably of a single face type. The width of the extension beyond the flutes depends on the package to be formed and may operably be from about 6 inches to about 18 inches or more. In a further embodiment, in forming a bundle the material of FIG. 1 can be used directly where the corrugate composite is cut and folded and sealed to form a corrugated top and bottom section, or the top and bottom may be left entirely open. The packaging material is useful in any of these embodiments, but packages wherein the top and bottom are sealed are preferred.

The packaging material of FIG. 1 may also be formed into corrugated carton blanks which can then be assembled into cartons. The material in this instance may be of a single or double face type. The carton when formed, by heat sealing or adhesives, can be heated to shrink the polymeric film prior to filling and sealing or after filling and sealing. When in a form to be heated, and the polymeric film shrunk prior to filling and sealing, the material is preferably of the double face type.

In a further embodiment of this invention, flat non-corrugated blanks can be formed at one place and these blanks shipped to the user who, by heat shrinking, forms these blanks into corrugated blanks. In this embodiment, a uniaxially oriented film is preferably adhesively attached at set points to a flat fluting type material. The film is preferably attached to both sides to form a double face material on heat shrinking, although a single sheet of film on one side may be used to form a single face material. It is usually desirable to precorrugate the fluting material and then flatten it out prior to attaching it to the film to assure an even corrugating without any irregular crinkling during subsequent heat shrinking corrugation. Further, in forming the double face material, each film is attached at alternating intervals along the flat fluting material so that when the films are heat shrunk, the decrease in dimension of the film corrugates the flat fluting material. The prime benefit of such a material is in the volume which must be transported to the user. There is greater efficiency in transporting a flat blank which is then treated to form corrugations, over transporting a corrugated sheet.

The process of heat-shrinking the face film or films is essentially that of subjecting the film to a temperature wherein by elastic memory the film loses its stretched orientation. The heat in this instance can be supplied by radiation, conduction or convection or any combination. In one technique, the bundles or cartons are conveyed through a tunnel containing lamps with a high infrared emission. In another method, warmed air is blown on, and if an unfilled and sealed carton, also in, the carton, shrinking the face films. In general, techniques and equipment for heat shrinking are well known and any of these can be adapted for use with this invention.

As is apparent from FIG. 5, both the corrugate and the bundle are here in a tightened condition. The shrunken film maintains the fluting in a tight and defined state, and the entire package in a compressed condition. Therefore, when stacked and a force is applied to the fluting, the fluting is not deformed in directions parallel or transverse to the fluting. The shrunken film maintains its tightening and compressive force on the fluting and package, preventing any sidewall bulging on stacking.

What is claimed is:

1. A package comprising at least one object tightly wrapped in a packaging material comprising a corrugated substrate having peaks and flutes on each face and a heat shrunk polymeric film attached to the peaks of at least the outer face of the corrugated substrate, said shrunken film maintaining the fluting and object in a tight, compressed state.

2. The package of claim 1 wherein said film is heat sealed to the peaks of the corrugated substrate.

3. The package of claim 1 wherein said film is adhesively bonded to the peaks of the corrugated substrate.

* * * * *